March 27, 1973     B. J. GAFFNEY     3,723,218
METHOD FOR THE MANUFACTURE OF NET AND NETLIKE PRODUCTS
Filed Oct. 5, 1970     2 Sheets-Sheet 1

INVENTOR.
DR. BERNARD J. GAFFNEY
BY
Eyre, Mann & Lucas
ATTORNEYS

March 27, 1973   B. J. GAFFNEY   3,723,218
METHOD FOR THE MANUFACTURE OF NET AND NETLIKE PRODUCTS
Filed Oct. 5, 1970   2 Sheets-Sheet 2

INVENTOR.
DR. BERNARD J. GAFFNEY
BY
ATTORNEYS

United States Patent Office 3,723,218
Patented Mar. 27, 1973

3,723,218
METHOD FOR THE MANUFACTURE OF NET AND NETLIKE PRODUCTS
Bernard J. Gaffney, Stillwater, Minn., assignor to Conwed Corporation
Filed Oct. 5, 1970, Ser. No. 78,080
Int. Cl. D01d 5/00; D04h 3/16
U.S. Cl. 156—167      7 Claims

ABSTRACT OF THE DISCLOSURE

A method and apparatus for the manufacture of net and netlike products from molten polymer is provided. The apparatus is comprised of at least two die members, one of which has one or more orifices therein for the extrusion of one or more strands or a sheet of polymer. The other die member has a single continuous orifice therein to which molten polymer is fed and from which the molten polymer is forcefully ejected at predetermined intervals to contact the extruding strands or sheet to cause bonding therebetween to form the product.

---

This invention related to a method and apparatus for producing a net or net like product from an extrudable polymer such as polypropylene. In accordance with the present invention, the apparatus for producing the product is comprised of a die having at least two die members, one of which is provided with either a plurality of orifices for the extrusion of a plurality of strands of polymer or a single orifice for the continuous extrusion of a sheet of polymer. The second die member is provided with a single orifice to which molten polymer is delivered and from which a molten polymer strand is forcefully ejected at predetermined intervals. The ejected strand is directed into physical contact with the extrudate of the first die member subsequent to extrusion thereof to cause bonding between the ejected strand and the extrudate to form the product. The extrudates may be brought together by angling the orifices of at least one of the die members towards the other die member or by directing one of the extrudates into the other subsequent to extrusion which may be done by placing a plate below one or more of the die member orifices to change the direction of the extrudate after it leaves the orifice. The strongest bond is achieved by bringing the two extrudates together immediately after extrusion so that the bond will form while the polymer takes a permanent set.

The word extrudate is used in this specification and claims to denote the state of the plastic material subsequent to its extrusion which is the same meaning used in the art.

The orifices in the first die member may be arranged in either a straight line or in an annular configuration to extrude a plurality of generally parallel longitudinal strands in either a straight or annular configuration respectively. If a sheet is to be extruded, the single orifice used to extrude the sheet may also be either straight or in an annular configuration to extrude a solid sheet or tube of polymer. If desired, the single orifice used to extrude a sheet or tube may be grooved or a plurality of closed cross section orifices may be provided adjacent the single orifice at appropriate locations to extrude a sheet or tube having a plurality of longitudinally extending ribs thereon.

The second die member orifice is preferably coextensive with the length or circumference of the first die member extrudate and may have either a fixed or variable opening. The orifice is preferably arranged to expel polymer transverse to and against one side of the first die member extrudate to form a sheet or tube having transverse ribbing thereon or a rectangular mesh net, depending on which of the above forms of the first die member is used. If desired, a third die member similar in construction and function to the second die member may be provided. The third die member orifice may be positioned to eject polymer on the side of the first die member extrudate opposite the side facing the second die member orifice to form a product having transverse strands on both sides.

The amount of polymer forcefully ejected from the second die member orifice determines the size of the transverse strand. In one embodiment of the invention, expulsion is periodic and is controlled by pulsing the polymer that is fed to the second orifice at periodic intervals under pressure. The polymer may be pulsed in any desired regular or irregular manner. It is this pulsating pressure which causes the forceful ejection of the polymer from the orifice. To aid in the ejection of the polymer, the orifice may be closed when the polymer is first fed to the second die member to permit the pressure force to consolidate the polymer during the closed period so that when the orifice is opened, the polymer is more quickly ejected.

In a second embodiment of the invention, the molten polymer is pulse fed to the second die member orifice and a portion of the second die member which forms the orifice is rotated to apply a centrifugal force to the polymer to forcefully eject it from the orifice. Pressure may be applied to the polymer as in the previous embodiment to give added impetus to the polymer as it is ejected by the centrifugal force.

In any case, the molten polymer must be ejected from the second die member orifice at sufficient velocity to cause bonding to the longitudinal strands or sheet, the sufficiency of which is determined by viewing the bonding structure.

In all cases, the molten polymer may be supplied to the die members by any conventional means, such as a screw extruder. In addition, a single extruder may be used to supply polymer to both die members or separate extruders may be used to supply polymer to each die member individually.

Referring now to the drawings which depict various preferred embodiments of the invention and in which like numerals refer to like parts:

Figure 1:
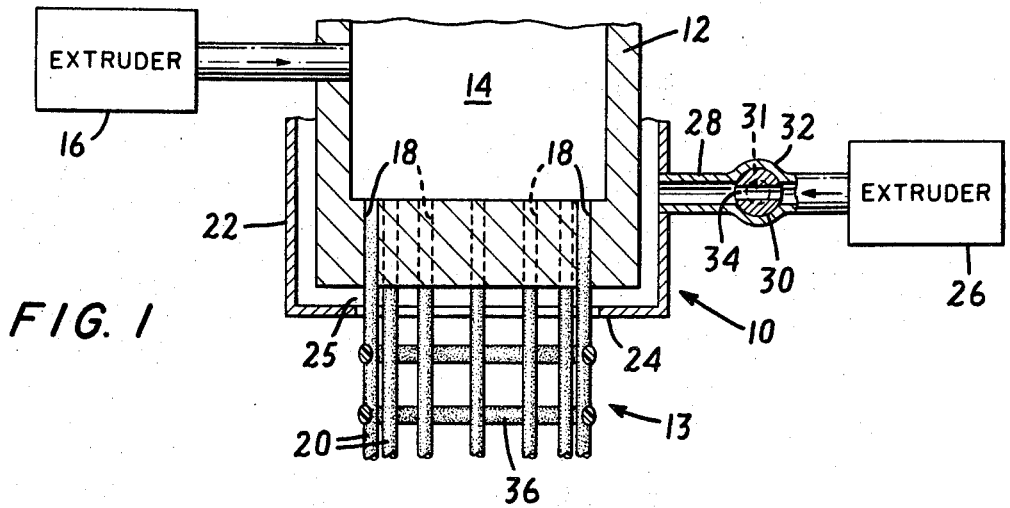
FIG. 1 is a schematic drawing of one embodiment of the die of the present invention shown in sections to illustrate the interior of the die.
Figure 2:
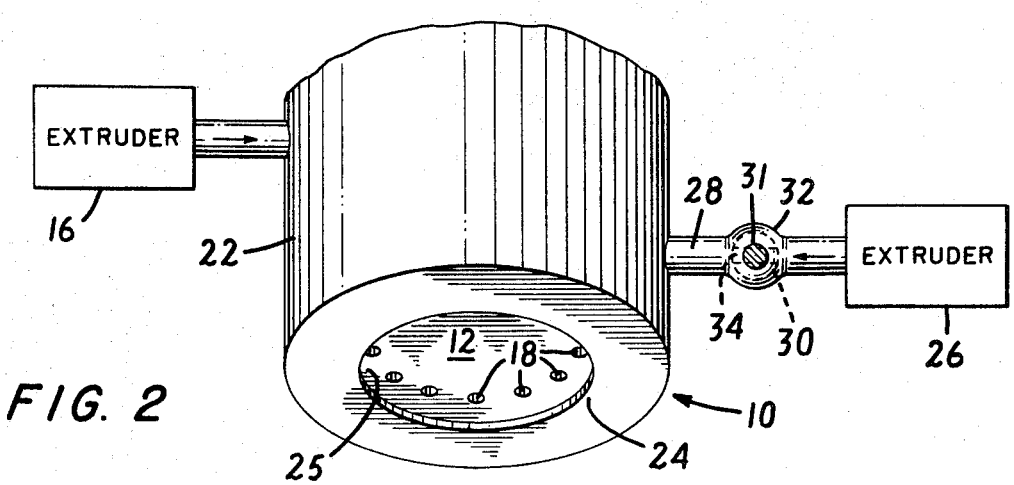
FIG. 2 is a partial isometric drawing of the embodiment of FIG. 1 but excluding the manufactured product.

Referring to FIGS. 1 and 2, an apparatus 10 for the formation of a tubular shaped polymer net 13 having a rectangular mesh structure is depicted. The apparatus 10 is comprised of a die member 12 which has a cavity 14 therein for the reception of molten polymer supplied under pressure by conventional means, such as the depicted screw extruder 16. In communication with cavity 14 is a plurality of orifices 18 arranged in a circle as shown through which the polymer from extruder 16 is continuously extruded as a plurality of parallel longitudinal strands 20.

Surrounding die member 12 and mounted thereon by conventional means (not shown) is a hollow annular jacket 22 which comprises the second die member. Jacket 22 extends below die member 12 and has an inwardly extending horizontal lip or flange 24 thereon which defines a continuous annular orifice 25 (FIG. 2). The lip 24 ends just adjacent the orifice 18 and serves to direct the polymer ejected from the orifice 25 against the extruding longitudinal strands 20.

An extruder 26 for supplying molten polymer under pressure is placed adjacent jacket 22 and is connected thereto by a cylindrical feed line 28 through which the molten polymer supplied by the extruder 26 is fed to the jacket. A rotating spherical ball valve 30 for pulsing the polymer flow from the extruder to the jacket 22 is mounted on shaft 31 in enlarged section 32 of feed line 28. Ball valve 30 has a bore 34 therein and the ball valve is rotated by conventional means (not shown) in the plane of the FIG. 1 drawing to bring bore 34 in and out of registry with the feed line 28. When bore 34 is in the position shown in FIG. 1, polymer flows through line 28 to jacket 22. When the bore 34 is facing the wall of enlarged section 32, polymer flow to jacket 22 is cut off. It can readily be appreciated that the rotation of the ball valve 30 provides for a pulsed flow of polymer to the jacket 22. The relationship of the time between the open and closed positions of valve 30 is determined by the size of enlarged section 32. Extruder 26 may be provided with a conventional pressure relief device such as an accumulator or relief valve to limit and control the pressure buildup within the extruder when ball valve 30 is closed to prevent damage to the extruder.

When valve 30 is open, the extrusion pressure which urges the polymer into the jacket will tend to evenly distribute the polymer in the jacket. The extrusion pressure also urges the polymer in the jacket 22 downwardly toward the orifice 25 where the polymer is forcefully ejected by the extrusion pressure and directed against the extruding longitudinal strands 20 by lip 24 to form the transverse strand 36. The size of the transverse strand is essentially determined by the amount of polymer that periodically flows through valve 30. Transverse strand size may be easily varied by providing the valve with a conventional speed control such as a voltage regulator if an electric rotation means is used or by providing the extruder with a conventional device to vary the extrusion pressure or a combination of the two.

The polymer ejected from the second die member may not have the sharp cut off required to form a well defined strand. The cut off of the extruded polymer strand may be improved by means of an airtight system in conjunction with the horizontal lip 24 which changes the direction of the polymer immediately prior to extrusion since the relatively viscous polymer has to be forced around the sharp bend. If desired, the lip 24 may be positioned to angle downwardly and in such case the cut off will not be very well defined which may be of advantage for the product at hand such as a solid wall tube or sheet.

If desired, an annular shield (not shown) may be mounted on the die member 12 to project down inside the annulus defined by the holes 18 to provide a backing for the longitudinal strands 20 against the force of the ejected polymer.

Figure 3:
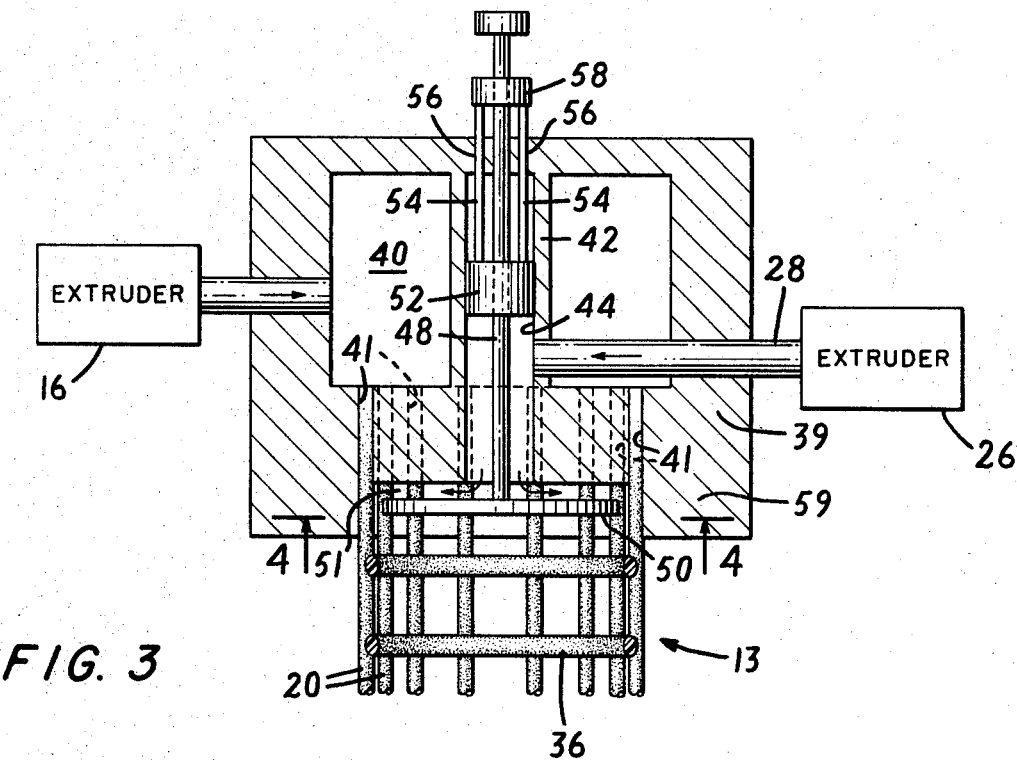
FIG. 3 is a schematic drawing of a second embodiment of the invention.

Referring to an alternate embodiment shown in FIG. 3, the die member 39 has an annular cavity 40 therein for the reception of polymer from the extruder 16. In fluid communication with the annular cavity 40 are a plurality of orifices 41 for the extrusion of a plurality of longitudinal strands 20 substantially as described above for the previous embodiment.

Annular cavity 40 has a central tube 42 which has a bore 44 therein to which molten polymer from extruder 26 is fed through feed line 28 for subsequent ejection.

Mounted within bore 44 is a vertically moveable shaft 48. Mounted on the shaft 48 at its lower extremity is a horizontal annular plate 50 spaced a predetermined distance below die member 39 to form an annular orifice 51 for the ejection of polymer, contained within the bore 44 against the extruding longitudinal strands 20. The plate has a diameter less than that of the circle defined by the inner edges of the orifices 41, but a larger diameter may be provided if the plate is notched (not shown) in the region of the orifices 41 to permit the unobstructed, continuous extrusion of the longitudinal strands 20.

Shaft 48 extends upwardly through bore 44 and slidably through a plunger block 52 which is in turn slidably mounted in the bore 44. Shaft 48 is supported in fixed position at the top of die member 39 by conventional means (not shown). Plunger block 52 is mounted on a pair of rods 54 which extend upwardly through bore 56 and are connected to spacer block 58. Spacer block 58 serves to tie both rods together and the block is reciprocated vertically by conventional means (not shown) such as a cam. When molten polymer is fed under pressure to bore 44 from extruder 26, the flow of polymer from the extruder to the bore is continuous and with the plunger block 52 in the position shown, the polymer will flow to the annular plate from which it will be ejected by the extruder pressure against the extruding longitudinal strands 20 in the general form of a circular transverse strand 36 which will not in most cases be as well defined as shown in the drawings. To support the extruding longitudinal strands against the thrust of the ejected polymer, die member 39 provided with a flange 59 which extends downwardly below the point at which the ejected polymer contacts the longitudinal strands. Although it is desirable to support the longitudinal strands against the thrust of the ejected polymer it is not necessary to do so and flange 59 may be removed if desired.

Flow of polymer to the annular plate is controlled by raising or lowering the plunger block 52. When the plunger block is raised, an open area is formed between the block and the polymer flowing into the bore 44 and the polymer thereby flows into the lower pressure open area instead of to the annular plate, which is at atmospheric pressure. Returning the block to its rest position forces the molten polymer into and out of orifice 51 against the extruding longitudinal strands. It will be appreciated from the foregoing that the continuous flow of polymer from extruder 26 is converted into a discontinuous, pulsed flow by the raising and lowering of the plunger block. The amount of polymer intermittently fed to the plate 50 is determined by the frequency at which the plunger block is moved up and down and the length of the plunger block stroke. In any given period of time, the amount of polymer delivered by extruder 26 is of course equal to the total amount of polymer extruder from the die member.

Figure 5:
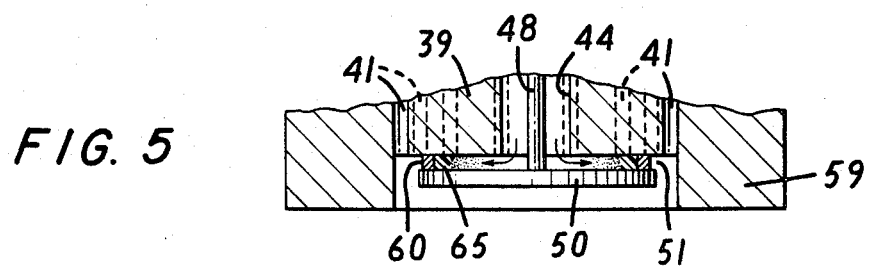
FIG. 5 is a partial schematic drawing of still another embodiment of the invention.

To aid in ejecting the polymer from the orifice 51, the shaft 48 and plate 50 may be rotated by conventional means (not shown) either in continuous manner or it may be rotated periodically and in synchronism with the plunger motion by conventional means (not shown) so that the rotation occurs only when the polymer is being ejected from the plate. Rotation of the plate aids in ejecting the polymer thereon by centrifugally inducing the polymer to exit from the orifice 51, thereby increasing the ejection force. The increased ejection force tends to enhance the degree of bonding between the longitudinal strands and the ejected polymer. Additionally, the shaft 48 and plate 50 may be made moveable in a vertical direction by conventional means (not shown) to squeeze the polymer as it is being ejected to further increase the ejection force. If a well defined transverse strand is desired the embodiment illustrated in FIG. 5 is employed or plate 50 may be moved upwardly to completely close the space between the two die members. Vertical movement of the plate may be used either alone or in conjunction with rotation to achieve a maximum ejection force. However, rotation is not used when the plate 50 is notched as described above because the plate portions between the notches would then interfere with the flow of the longitudinal strands. If desired, the plunger block 52 may be eliminated and plate 50 rotated or reciprocated to supply the necessary ejection force.

Figure 6:
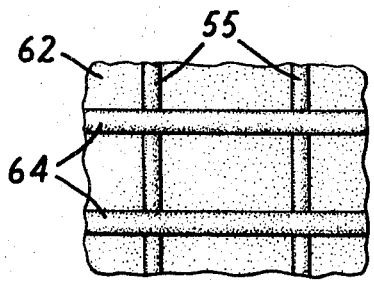
FIG. 6 is a partial plan view of one type of product which may be made with the apparatus of the present invention.
Figure 4:
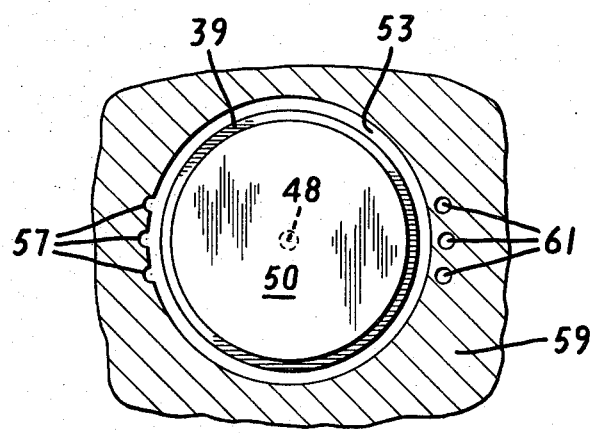
FIG. 4 is a view taken on line 4—4 of FIG. 3.

FIG. 4 depicts a somewhat varied embodiment of the apparatus of FIG. 3. More specifically, the orifices 41 of FIG. 3 have been replaced by a single annular orifice 53 from which a tube of polymer 62 (FIG. 6) is extruder instead of a plurality of individual strands. If desired, a plurality of strands 55 (FIG. 6) may be extruder integrally with the tube by providing a plurality of grooves 57 around the periphery of the annular orifice 53 or the strands may be extruded separately as by separate orifices 61 and bonded to the tube subsequent to the extrusion of the tube by directing the two into contact with each other.

FIG. 5 is essentially a duplicate of the apparatus described in connection with FIG. 3 with the addition of an annular ring 60 which is mounted on the die 39. Ring 60 is designed for use with the apparatus of FIG. 3 should it be desired to provide a sharper flow cut off at the orifice 51 then would be available with the structure of FIG. 3. In operation, polymer is pulse fed to the plate 50 while the plate is in contact with the ring 60 to permit the polymer to build up against the ring to create a preformed slug of polymer 65. The plate may be rotated while the plate is in contact with the ring although this is not particularly desirable because the friction between the ring and plate would generate unnecessary wear. After a predetermined build-up of polymer against the ring 60 has occurred, the plate 50 is moved downwardly to allow ejection of the entire preformed polymer slug 65. The plate may be rotated conjointly with its downward movement to centrifugally aid in the ejection of the slug. Preforming the slug of polymer in the manner described tends to decrease the time needed for complete ejection of the slug and it also tends to decrease the longitudinal direction length of the transverse strand 36 to tend to give a net structure having larger open pore areas than usual.

Although two extruders are shown in FIG. 3 embodiment, it is to be understood that a single extruder may be used to feed polymer under pressure to the cavity 40 and the bore 44 as long as an opening is provided in hollow tube 42 to permit polymer to flow into the bore 44. Pulsing in this instance will be controlled by movement of the plunger 52 as described above. Alternately, where a separate extruder is used to supply polymer to bore 44 as shown in FIG. 3, the plunger 52 may be removed and a ball valve as shown in FIG. 1 may be inserted in feed line 28 to control the pulsing of the polymer to the bore 44. This may also be achieved by use of a single extruder having two feed lines (not shown) one of which feeds cavity 40 and the other of which feeds the bore 44 which arrangement may also be used in the FIG. 1 embodiment. Additionally, a plunger such as plunger 52 made in the form of an annular ring may be mounted in jacket 22 to control pulsation of polymer in the structure of FIG. 1 as described for the FIG. 3 embodiment. In such case the ball valve 30 may be eliminated. Ball valve 30 shown in the FIG. 1 embodiment may be replaced by a vertical tube extending from the feed line 28 (not shown), in which the plunger 52 of FIG. 3 may be slidably mounted to effectuate the pulsing of polymer to the jacket 22 in substantially the same manner as described in connection with the FIG. 3 embodiment.

In either of the embodiments described in connection with the FIG. 1, 3 or 5 embodiment, orifices 18 or 41 may be omitted and one large annular orifice (not shown) used in place of the plurality of orifices to extrude a continuous sheet of polymer. Also, the grooves 57 or orifices 61 shown in FIG. 4 may be provided along with the continuous annular orifices in any of the embodiments if this is desired. The impingement of transverse ribs and 55 are the longitudinal ribs. It is to be noted that the longitudinal ribs need not be present and the product may comprise only a solid tube or sheet 62 with transverse ribs 64.

Many modifications of the described apparatus for the manufacture of net and net like products by the pulse feeding and forceful ejection of polymer against longitudinal strands, sheet or tubes will occur to those skilled in the art and it is intended to cover all changes and modifications of the preferred embodiments of the invention which do not constitute departures from the spirit and scope of the invention.

What is claimed is:

1. The method of melt extruding a tubular net like product in which one set of strands is normal to a second set of strands comprising:
    (a) extruding a plurality of parallel strands from spaced extrusion orifices arranged in an annular configuration;
    (b) separately and intermittently extruding an annular ring of polymer from a separate orifice;
    (c) ejecting the separately extruded annular ring of polymer towards the plurality of parallel strands in a direction normal thereto whereby the separately extruded annular ring of polymer comes into contact with and is joined to at least two of the parallel strands; and
    (d) wherein the contacting and joining of the parallel strands and the separately extruded annular ring takes place after the parallel strands and annular ring have been separately extruded and while at least the annular ring is still molten.

2. The method specified in claim 1 wherein the step of ejecting polymer from separate orifice includes the step of pulsing the polymer which is fed to the separate orifice to periodically interrupt the expulsion of polymer from said separate orifice.

3. The method specified in claim 2 wherein the step of ejecting polymer from the separate orifice includes the step of opening and closing the separate orifice to assist in interrupting the expulsion of polymer from said separate orifice.

4. The method specified in claim 2 wherein the step of ejecting polymer from the separate orifice includes the step of rotating at least a portion of said separate orifice to assist the pulsation extrusion of polymer from said separate orifice.

5. A method of producing a net like structure having a plurality of parallel longitudinal strands joined by transverse slugs normal thereto which comprises:
    (a) melt extruding a plurality of longitudinal strands from a series of spaced extrusion orifices arranged in an annular configuration;
    (b) separately melt extruding and preforming a transverse slug of polymer;
    (c) directing the preformed transverse slug of polymer towards the said plurality of longitudinal strands whereby the slug of polymer comes into contact with at least two of said plurality of longitudinal strands and is joined to them at an angle normal to the direction of extrusion of the plurality of longitudinal strands; and
    (d) wherein the contacting and joining of the transverse slug and the plurality of longitudinal strands takes place after the transverse slug and the plurality of longitudinal strands have been separately extruded and while at least the transverse slug is still molten.

6. An apparatus for producing a product from molten polymer comprising a first die member having a plurality of orifices therein arranged in an annular configuration for the continuous extrusion a plurality of parallel strands; a second and separate die member in association with said first die member and having a second orifice means disposed with respect to the orifices in said first die member for directing a ring of polymer extruded therefrom in a direction normal to the direction of extrusion of said plurality of parallel strands, and means for intermittently forcefully ejecting the polymer from said second die member against said plurality of parallel strands to cause bonding between the ring of ejected polymer and the plurality of parallel strands.

7. An apparatus as specified in claim 6 further comprising means for periodically pulse feeding molten polymer to said second die member.

References Cited
UNITED STATES PATENTS

| | | | |
|---|---|---|---|
| 3,172,154 | 3/1965 | Martin et al. | 161—DIG. 6 |
| 3,266,092 | 8/1966 | Corbett | 18—13 D |
| 3,345,444 | 10/1967 | Pratt | 264—167 |
| 3,382,122 | 5/1968 | Nalle | 264—167 |
| 3,384,692 | 5/1968 | Galt et al. | 156—500 |
| 3,444,588 | 5/1969 | Martin et al. | 264—167 |
| 3,453,688 | 7/1969 | Otstot et al. | 264—167 |
| 3,473,986 | 10/1969 | Hureau | 264—167 |

ROBERT F. BURNETT, Primary Examiner

J. C. GIL, Assistant Examiner

U.S. Cl. X.R.

156—180, 244, 433, 500; 161—DIG. 6, 109, 58; 264—167, DIG. 20; 425—113, 425